Aug. 29, 1967  R. W. PLUME  3,338,346
AUTOMATIC ADJUSTING SYSTEM FOR A VEHICLE BRAKE
Filed Sept. 20, 1965
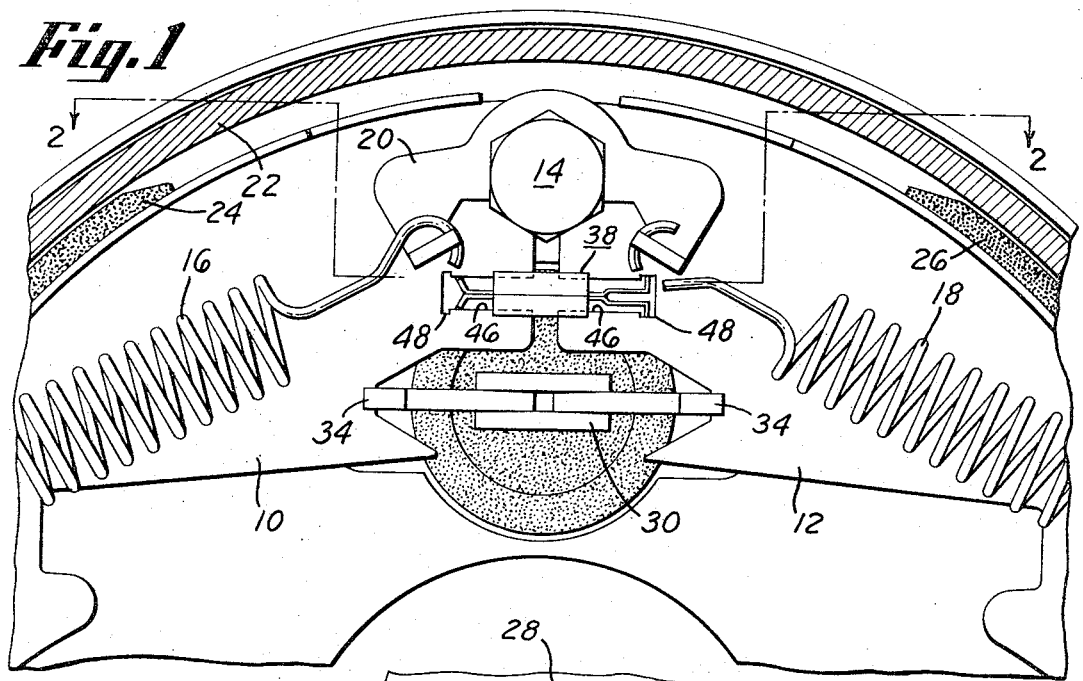
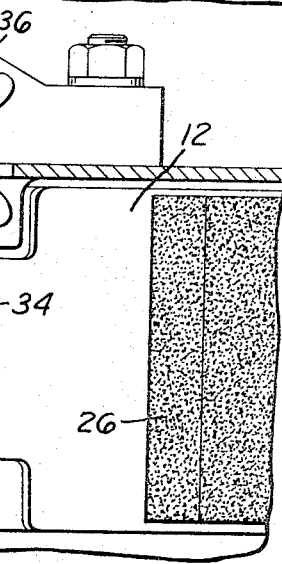
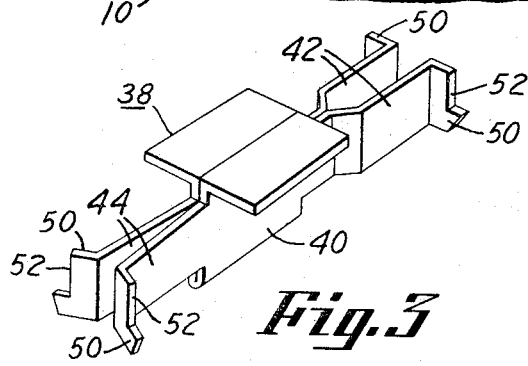
INVENTOR.
ROBERT W. PLUME
BY
Donald P. Selvecki
ATTORNEY

United States Patent Office 3,338,346
Patented Aug. 29, 1967

3,338,346
AUTOMATIC ADJUSTING SYSTEM FOR A
VEHICLE BRAKE
Robert W. Plume, Utica, Mich., assignor to General
Motors Corporation, Detroit, Mich., a corporation of
Delaware
Filed Sept. 20, 1965, Ser. No. 488,456
3 Claims. (Cl. 188—79.5)

ABSTRACT OF THE DISCLOSURE

In a preferred form, this invention relates to a unitary spring metal friction member incorporating a slight bit of lost motion which operates as an automatic brake adjuster for a braking system utilizing an external wheel cylinder. The spring adjuster member is inserted in slots at the ends of the brake shoes, one end of the member frictionally engaging one shoe and the other end having a lost motion connection to the other shoe.

---

This invention relates to braking mechanism and more particularly to an automatic brake adjuster.

This invention relates to an automatic brake adjusting mechanism that is adaptable for use on the brake actuator disclosed in copending application Ser. No. 381,172, now U.S. Patent 3,269,493. In the operation of the brake actuator disclosed in the referenced application Ser. No. 381,-172, an automatic brake adjusting mechanism for use therewith is desirable. The subject invention provides a very simple and economical structure for automatically adjusting the type of brake having a wheel cylinder external to the drum wherein brake actuations are effected by use of bell cranks.

It is an object of the present invention to provide a very simple and economical automatic brake adjuster for use with braking mechanism having an externally mounted wheel cylinder.

It is another object of the present invention to provide an improved brake adjusting mechanism which is adaptable for use on brakes of existing design.

It is still another object of the present invention to provide an improved automatic brake adjuster which utilizes a single unitary spring metal member adapted to engage opposed ends of conventional brake shoes.

Further objects and advantages of the present invention will be apparent from the following description, reference being had to the accompanying drawings wherein a preferred embodiment of the present invention is clearly shown.

In the drawings:

FIGURE 1 is an elevational view of a braking system of the external wheel cylinder type illustrating the subject invention in its operative environment;

FIGURE 2 is a sectional view taken along line 2—2 of FIGURE 1;

FIGURE 3 is a perspective view of the subject invention.

Referring to FIGURE 1, brake shoes 10 and 12 are carried by a fixed portion of the vehicle and are biased into engagement with anchor pin 14 by springs 16 and 18 respectively. Springs 16 and 18 operatively engage brake shoes 10 and 12 at one end with an opposite end of the springs engaging shoe retainer plate 20. Brake drum 22 is carried in any well-known manner by a vehicle wheel and adapted to frictionally engage the rotatable drum 22 to bring about a braking action. As seen in FIGURE 1, the braking system is in a poised position and a predetermined amount of clearance is maintained between linings 24 and 26 relative to drum 22.

Referring to FIGURE 2, wheel cylinder 28 is carried externally of drum 22 and has reciprocal output member 30 carrying pins 32 which drivably engage bell cranks 34. Bell cranks 34 are pivotable on links 36 attached to wheel cylinder 28. Movement of output member 30 in responding to a pressure build-up in wheel cylinder 28 results in a pivoting of bell cranks 34 on links 36 to drive shoes 10 and 12 into frictional engagement with drum 22. Return springs 16 and 18 draw shoes 10 and 12 away from drum 22 upon relief of pressure in wheel cylinder 28.

Unitary resilient member 38 is illustrated in FIGURE 3 and includes a main body portion 40, holding portions 42 and gripping portions 44. Gripping portions 44 are deflectable legs adapted to frictionally engage one of the brake shoes, for example, brake shoe 10, as illustrated in FIGURE 1. Holding portions 42 are arranged to be deflected toward one another and move into T-shaped slots 46 formed in complementary fashion in shoes 10 and 12. The enlarged portion 48 of slot 46 forms the T, and is adapted to receive outwardly projecting hook members 50 carried by gripping portions 44 and holding portions 42.

Referring to FIGURE 1, resilient member 38 is installed by portions 42 being compressed and pushed into one T 48 wherein hook portions 50 retain member 38 against accidental disengagement therefrom. The width of the enlarged slot 48 in which hook portions 50 are slidable is proportional to the amount of desired clearance between linings 24 and 26 relative to drum 22. Hook portions 50 carried by gripping portions 44 are likewise installed by being compressed and driven into an enlarged slot 48 but surfaces 52 thereof frictionally engage the sides of slot 46 with sufficient force to exceed the compressive force of return springs 16 and 18. In a manner to be described hereinafter, surfaces 52 are movable in slot 46 only by a force from wheel cylinder 28.

In operation, while the braking mechanism shown in FIGURE 1 is in the poised position, springs 16 and 18 provide an equal force against brake shoes 10 and 12 to maintain them in juxtaposition to anchor pin 14. Springs 16 and 18 being of equal strength, the brake shoes are centered relative to anchor pin 14. When a braking action is desired, pressure is built up in any well-known fashion in wheel cylinder 28, and output member 30 through pins 32 pivots bell cranks 34 and provides an expanding force against shoes 10 and 12. Hook portion 50 carried by holding portions 42 moves in the enlarged slot 48 toward the end of the slot. If brake lining wear has not progressed to a point requiring adjustment, the clearance between linings 24 and 26 relative to drum 22 is taken up and braking action takes place. When pressure is released from wheel cylinders 28, springs 16 and 18 become dominant, drawing brake shoes 10 and 12 to a centered position relative to anchor pin 14 resulting in the reverse movement of hook portions 50 carried by holding portions 52 in slot 48.

During actuation of the brakes in the aforementioned manner, under conditions when brake adjustment is necessary, the mechanism operates in the following sequence. As brake linings 24 and 26 wear, the desired clearance between the brake linings and drum 22 will be exceeded and the edge of slot 48 will grasp and hold resilient member 38 before linings 24 and 26 contact drum 22. Further shoe movement is necessary in order to achieve a braking action and the force from wheel cylinder 28 transmitted through bell cranks 34 causes surfaces 52 to slide on the edges of slot 46. Sufficient sliding will occur to allow a braking action to develop between linings 24 and 26 with drum 22.

When braking is no longer desired, the pressure is relieved in wheel cylinder 28 and springs 16 and 18 become the dominant force acting on shoes 10 and 12. Hook portions 50 will be drawn to the opposite extremity of slot 48, resulting in a withdrawal of linings 24 and 26 from drum 22. As previously stated, the width of slot 48 is proportional to the clearance desired between the brake linings and drum 22. Surfaces 52 of gripping portions 44 have assumed a new position on the edge of slot 46 which cannot be disturbed by springs 16 and 18. Therefore, future brake actuations occur from this newly established position and the brake adjustment is complete.

The subject invention finds particular utility in the environment illustrated wherein the wheel cylinder is mounted externally of the drum but is also an effective means for automatically adjusting conventional band or disc brakes. Any braking action involving opposed movement of two members can utilize the resilient member 38 to first measure the desired clearance and then adjust to a new fixed position when necessary to provide an automatic brake adjusting. The advantage of the subject invention is its simplicity and economy of manufacture. It is clear that resilient member 38 can be formed of stamped steel to assume the desired configuration and, thereafter, placed in complementary formed slots in opposed braking members. Brake adjustment thereafter is automatic and, when the lining material is completely dissipated and replaced, member 38 can be zeroed in slot 46 or an entirely new resilient member can be provided. The low cost of the type construction shown lends itself to replacement and, consequently, prolonged proper brake adjusting.

While the embodiment of the present invention, as herein disclosed, constitutes a preferred form, it is to be understood that other forms might be adopted.

What is claimed is as follows:

1. An automatic brake adjuster comprising: a pair of brake shoes including brake linings carried in end to end relationship by a fixed portion of a vehicle: a brake drum rotatable with a vehicle wheel and positioned for rotation a predetermined distance away from said brake linings, said predetermined distance being increased as wear occurs on said brake linings; and resilient means fixed to one brake shoe and frictionally engaging another brake shoe for maintaining a controlled amount of movement capability of said brake shoes relative to said brake drum as brake lining wear progresses, said resilient means having holding portions cooperating with one of said brake shoes to allow a predetermined amount of movement therebetween corresponding to the desired amount of movement between said brake shoes and said brake drum, and resilient legs frictionally gripping a second brake shoe and adapted to regrip said second brake shoe at a new point as lining movement exceeds the predetermined amount.

2. An automatic brake adjuster comprising: a plurality of brake shoes having linings thereon and being carried by a fixed portion of a vehicle, said shoes carried in end to end relationship and including complementary formed T-shaped slots therein; a brake drum rotatably carried by a vehicle wheel in juxtaposition to the linings of said brake shoes; and adjusting means including a resilient member with first portions for frictionally gripping one of said brake shoes and second portions for engaging at least one of said T-shaped slots with a lost motion connection, said adjusting means permitting an amount of relative movement between said second portions and said brake shoe proportional to the desired clearance between the brake shoes and brake drum, the first portions sliding in said T-shaped slots to a new gripping position when lining wear necessitates greater movement during brake actuation than the desired amount, the lost motion being permitted by said first portions from the new gripping position.

3. An automatic brake adjuster according to claim 2 wherein said adjusting means includes a unitary resilient member having a plurality of hooked resilient legs movable in opposition to one another and arranged to be forced into a T-shaped slot of the brake shoes and be slidable relative thereto, and a plurality of deflectable resilient legs having gripping surfaces adapted to engage the sides of other T-shaped slots of the brake shoes being frictionally engaged therewith.

References Cited

FOREIGN PATENTS 449,527  6/1949  Italy.

DUANE A. REGER, *Primary Examiner.*